United States Patent [19]

Neuman et al.

[11] 4,384,263
[45] May 17, 1983

[54] LEADLESS FILTER

[75] Inventors: Werner E. Neuman, Deerfield; Michael B. Head, Arlington Heights; Marshall L. Kummel, Buffalo Grove, all of Ill.

[73] Assignee: Corcom, Inc., Libertyville, Ill.

[21] Appl. No.: 250,106

[22] Filed: Apr. 2, 1981

[51] Int. Cl.³ ............................................. H03H 7/01
[52] U.S. Cl. .................................. 333/181; 333/185; 361/329
[58] Field of Search ................................ 333/167–170, 333/181–185, 172, 12; 361/303–309, 328–329, 330, 395, 397, 400–405, 313

[56] References Cited

U.S. PATENT DOCUMENTS

| 2,270,169 | 1/1942 | Muller | 333/185 X |
|---|---|---|---|
| 3,681,612 | 8/1972 | Vogl et al. | 333/182 X |
| 3,806,770 | 4/1974 | Voyles et al. | 361/306 X |
| 4,301,354 | 11/1981 | Williams | 361/308 X |
| 4,320,364 | 3/1982 | Sakamoto et al. | 333/167 |

Primary Examiner—Marvin L. Nussbaum
Attorney, Agent, or Firm—Hill, Van Santen, Steadman, Chiara & Simpson

[57] ABSTRACT

A capacitor arrangement comprising a pair of line to ground planar capacitors with electrical terminals on each side with a grounding tab connected to the electrical terminals on the first sides of the line to line capacitors, and with a pair of hair pin leads, respectively, connected to the terminals on the second sides of the line to ground capacitors. A modified form includes a line to line capacitor connected between the line to ground capacitors with very short leads so as to reduce the inductance.

5 Claims, 6 Drawing Figures

U.S. Patent
May 17, 1983
4,384,263
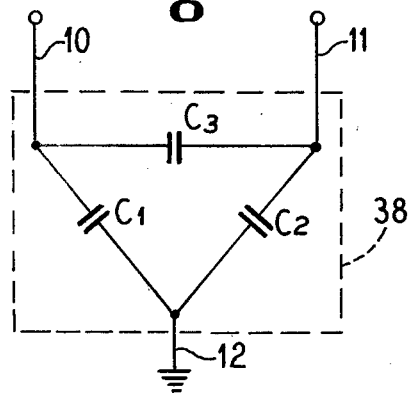
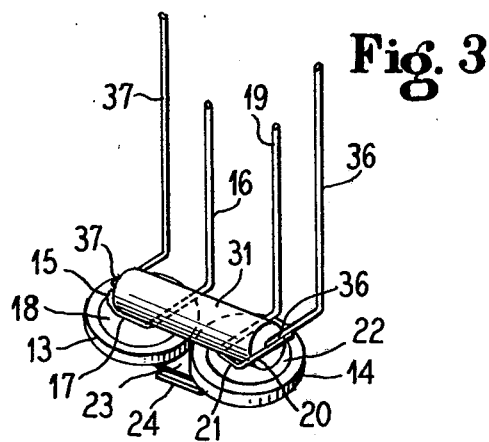
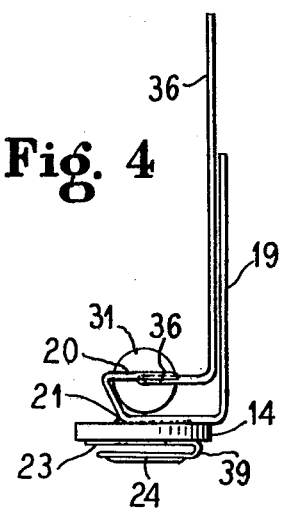
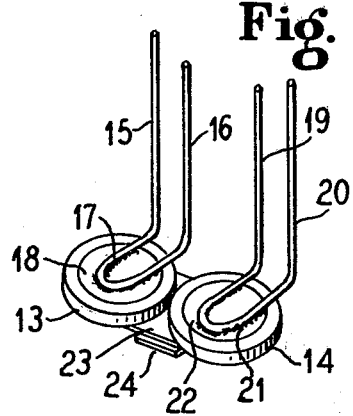
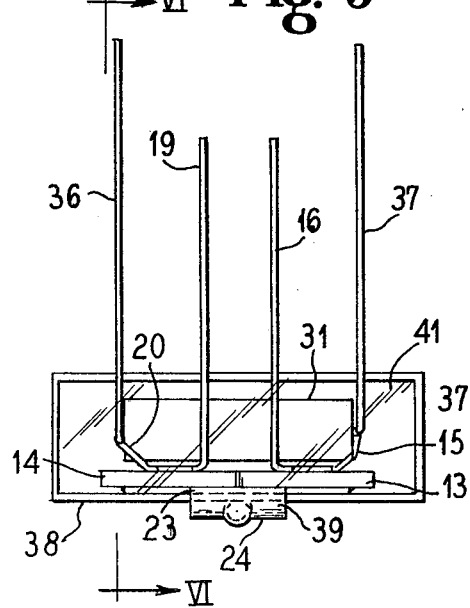
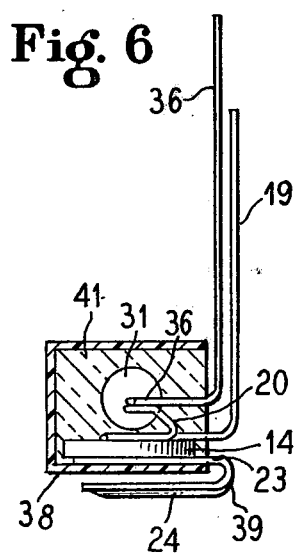

LEADLESS FILTER

BACKGROUND OF THE INVENTION

1. Field of the Invention

This invention relates in general to filters and in particular to a leadless arrangement which reduces and substantially eliminates inductances.

2. Description of the Prior Art

It is particularly desirable to remove high frequency components from power supplies and prior art filters have provided line to line and line to ground capacitors which provide low impedance to high frequencies between the lines to ground. However, such prior art filters have had conductor leads of substantial lengths which at high frequencies act as inductances which can provide a high impedance and block high frequency electrical components.

SUMMARY OF THE INVENTION

It is an object of the present invention to provide very short lead lengths for filters so as to reduce and eliminate inductance. The shorter the lead the less the inductance.

Another object of the invention is to provide a pair of line to ground capacitors which are leadless and have little or no inductance.

Another object of the invention is to provide a five lead capacitor arrangement with two capacitors between the lines and ground and a third capacitor between the lines and in which the inductance is very low or substantially zero.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is an electrical schematic for illustrating the invention;

FIG. 2 is a perspective view illustrating a pair of line to ground capacitors according to the invention;

FIG. 3 illustrates a modified form of the invention;

FIG. 4 is an end view of the invention illustrated in FIG. 3;

FIG. 5 illustrates the invention according to FIGS. 3 and 4 mounted in a suitable container; and FIG. 6 comprises a sectional view taken on line VI—VI from FIG. 5.

DESCRIPTION OF THE PREFERRED EMBODIMENTS

FIG. 1 illustrates in schematic form a filter with a pair of terminals 10 and 11. A first lead to ground capacitor C1 is connected between terminal 10 and ground terminal 12 and a second ground to lead capacitor C2 is connected between ground 12 and lead 11. A line to line capacitor C3 is connected between terminals 10 and 11 and the dash line 38 represents a housing in which the capacitors C1, C2 and C3 are mounted. Since the capacitors have relatively low impedance to high frequency signal components, the capacitors C1 and C2 will pass high frequency components existing at terminals 10 and 11 to ground. The capacitor C3 will provide a low impedance to high frequency components between the terminals 10 and 11.

FIG. 2 illustrates a pair of capacitors 13 and 14 which are formed with metal foil 18 and 22 on the upper surfaces as shown in FIG. 2 and which are also provided with metal foil on the undersides thereof which is not visible in FIG. 2 and to which a U-shaped tab 23 is attached and which has a lower portion 24 connected by a connecting portion 39 to the main part of the tab. A first hair pin lead comprising the central portion 17 and upwardly extending leads 15 and 16 is connected as by soldering to the foil 18 of condensor 13 and a second hair pin-shaped lead comprising a center portion 21 and parallel leads 19 and 20 are attached to the foil 22 of capacitor 14. The hair pin-shaped leads thus formed provide very low or zero inductance because any inductive effect is eliminated due to the parallel leads 15 and 16 and or 19 and 20, respectively.

FIGS. 3 and 4 illustrate the structure of FIG. 2 which has been modified to add a line to line capacitor 31. As shown for example in FIG. 3, the capacitor 31 may be a film foil capacitor which has leads which extend out of opposite ends thereof. It is desirable to provide that the lead length between the electrical connection points of capacitor 31 and the electrical connection points of the capacitors 13 and 14 be as short as possible so as to provide zero or minimum inductance. To accomplish this, the lead 20 is attached to the end lead 36 of the capacitor 31 as shown, for example, in FIG. 4, and the lead 36 extends upwardly parallel to the lead 19.

Also, the lead 15 connects to the second end of the capacitor 31 as shown in FIG. 5 and is electrically connected to the output lead 37 of the capacitor 31. Thus, the lead lengths from the capacitors to end leads 36 and 37 of the capacitor 31 is maintained as short as possible and this will reduce or eliminate the inductive effect.

It is to be noted also that the leads 36 and 37 extend parallel respectively to the leads 19 and 16 so that the advantages of the hair pin type connection leads is retained which has very low or zero inductance.

FIG. 5 illustrates the structure of FIGS. 3 and 4 mounted in a container 38 and it is to be noted that the lower portion 24 of the tab 23 extends out of the container 41. This is clearly illustrated in FIG. 6, for example, from the side view wherein the tab 24 is external of the container 38 where it can be electrically connected by solder or other means to a ground plane so as to provide the ground connection 12 illustrated in FIG. 1.

By making the lead lengths 15 and 20 between the capacitors 13 and 14 and the capacitor 31 as short as possible assures that the inductance will be zero or very small.

In a model constructed according to the invention, the capacitors 13 and 14 were ceramic capacitors and each had a capacitance of 5,000 pf and the capacitance of the capacitor 31 was 0.1 mf. Thus, in this example the capacitance of the capacitor 31 was twenty times the capacitance of each of the capacitors 13 and 14.

Thus, the invention illustrated in FIG. 2 comprises a pair of line to ground capacitors with a grounding tab 23 of electrical conducting material and the embodiment illustrated in FIGS. 3 through 6 comprise a pair of line to ground capacitors in combination with a line to line capacitor with a grounding tab.

As shown in FIG. 6, the container 38 may be filled with a suitable encapsulating material 41 to protect the structure.

The leads 15 and 16 would be connected to terminal 10 in the schematic of FIG. 1 and the leads 19 and 20 would be connected to the terminal 11 in the schematic of FIG. 1. In FIGS. 3 through 6, the leads 16 and 37 would be connected to terminal 10 and the leads 19 and 36 would be connected to terminal 11. Thus, in the present application the length of the leads from the power leads to the capacitor C3 as well as the leads to the capacitors C1 and C2 should be as short as possible.

Although the invention has been described with respect to preferred embodiments, it is not to be so limited as changes and modifications can be made which are within the full intended scope of the invention as defined by the appended claims.

We claim as our invention:

1. A capacitor arrangement comprising, first and second planar line to ground capacitors with electrical terminals on opposite sides thereof, an electrical conducting grounding tab electrically connected to first sides of said first and second line to ground capacitors, a line to line capacitor with electrical terminals on first and second ends thereof and positioned so that its ends are closely adjacent to said electrical terminals on the second sides of said first and second line to ground capacitors, respectively, a first short lead portion connected between the electrical terminal on the second side of said first line to ground capacitor and the electrical terminal on the first end of said line to line capacitor, a second short lead portion connected between the electrical terminal on the second side of said second line to ground capacitor and the electrical terminal on the second end of said line to line capacitor, a third lead portion attached to the electrical terminal on the first end of said line to line capacitor, a fourth lead portion attached to the electrical terminal on the second side of said first line to ground capacitor and said third and fourth lead portions extending parallel to each other, a fifth lead portion attached to the electrical terminal on the second end of said line to line capacitor, a sixth lead portion attached to the electrical terminal on the second side of said second line to ground capacitor and, said fifth and sixth lead portions extending parallel to each other.

2. A capacitor arrangement according to claim 1 wherein said first and third lead portions form a common lead and wherein said second and fifth lead portions form a common lead.

3. A capacitor arrangement according to claim 1 including a case in which said first and second line to ground capacitors and said line to line capacitor is mounted and said third, fourth, fifth and sixth lead portions extend out of said case.

4. A capacitor arrangement according to claim 3 wherein said tab has a portion which extends ous of said case.

5. A capacitor arrangement according to claim 4 wherein encapsulating material covers said first and second line to ground capacitors and said line to line capacitor within said case.

* * * * *